United States Patent Office 3,064,021
Patented Nov. 13, 1962

3,064,021
ORGANOMETALLIC COMPOUNDS
Geoffrey Wilkinson, London, England, assignor to Ethyl Corporation, New York, N.Y., a corporation of Delaware
No Drawing. Filed Aug. 8, 1958, Ser. No. 753,889
Claims priority, application Great Britain May 16, 1958
13 Claims. (Cl. 260—429)

This invention relates to novel organometallic compounds and a process for their preparation. More particularly, this invention relates to certain organic group VIB transition metal carbonyl compounds. An object of this invention is to provide a novel class of organometallic compounds. A further object is to provide a process for the preparation of certain novel organic group VIB transition metal carbonyl compounds. Other objects will be apparent from the following description.

This invention comprises cycloheptatriene group VIB transition metal carbonyl coordination compounds. These compounds may be represented by the formula:

$$AM(CO)_3$$

where A is a cycloheptatriene compound coordinated to the metal, M, which itself represents a transition metal of group VIB of the periodic table, namely chromium, molybdenum and tungsten. The periodic table referred to is that appearing in "Handbook of Chemistry and Physics" 37th edition, pages 392 and 393 (Chemical Rubber Publishing Company, 1955).

The compounds of this invention are prepared by a process which comprises reacting a group VIB transition metal carbonyl with an organic cycloheptatriene compound. It has been found that this preparation may be accomplished in a system where the only reactants are group VIB transition metal carbonyls and the organic compound. When desired, the reaction can be conducted in a high boiling solvent.

The process of this invention can be summarized by the following chemical equation in which A represents a cycloheptatriene compound and M represents a group VIB transition metal as defined above:

$$A + M(CO)_6 \rightarrow AM(CO)_3 + 3CO$$

Thus, carbon monoxide is given off as a product of this reaction.

The group VIB transition metal carbonyl compounds which are reactants in the process of this invention include chromium hexacarbonyl, molybdenum hexacarbonyl and tungsten hexacarbonyl. A preferred embodiment of this invention comprises the reaction of molybdenum hexacarbonyl with a cycloheptatriene compound to produce a cycloheptatriene molybdenum tricarbonyl. This embodiment is preferred as the compounds prepared are highly useful chemical entities.

The temperatures employed in the process of this invention may vary over a wide range. In general, temperatures of from about 115° C. to 300° C. are employed. However, a preferred range of temperature is from 115° C. to 225° C. as the reaction in this temperature range leads to a high yield of products with a minimum of undesirable side reactions. Reaction times of from 1 to 10 hours or longer may be employed. Ordinarily, heating periods of from 2 to 7 hours are sufficient to produce a good yield of product.

Cycloheptatriene is a conjugated cyclic hydrocarbon having 3 carbon-to-carbon double bonds in a 7 carbon atom ring. The compound has the formula $C_7H_8$. It can be represented by the following formula:

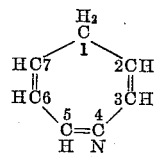

The cycloheptatriene compound which is a reactant in the process of this invention can be selected from a wide range of cycloheptatriene organic compounds. The applicable compounds include, for example, cycloheptatriene, 1-cycloheptatrienyl cycloheptatriene, 1-methylcycloheptatriene, 2-isopropylcycloheptatriene, 1,4-diethylcycloheptatriene, 4-phenylcycloheptatriene, 3-decylcycloheptatriene, 1-tert-butylcycloheptatriene, 1,3-diisopropylcycloheptatriene, 1-hydroxycycloheptatriene, 1-cycloheptatrienyl carboxylic acid propylester, 3-cycloheptatrienyl butylether, 2-N-ethylcycloheptatrienyl amine, 1-methylaminocycloheptatriene, 1-chlorocycloheptatriene, 3,5-di-methoxycycloheptatriene, 1-di-methoxymethylcycloheptatriene, 3-isopropyl-1-phenylcycloheptatriene, 1-methyl-4-phenylcycloheptatriene, 3-hydroxymethylcycloheptatriene, 1-cycloheptatriene carboxylic acid, and the like. Those compounds having up to about 14 carbon atoms are preferred since they lead to more easily recoverable products and constitute the most readily available cycloheptatriene compounds.

Whereas the process of the present invention can be conducted at atmospheric pressure at the reflux temperature of the system, higher or lower temperatures and higher pressures may also be conveniently employed. The most practical low temperature limit is the boiling temperature of the particular cycloheptatriene compound employed. In certain instances, it is desirable to conduct the reaction in the vapor phase by passing the vapor of the cycloheptatriene compound over the metal carbonyl in a hot tube. When the reaction is conducted at superatmospheric pressure, temperatures of from 150° C. to 250° C. are preferred although temperatures outside this range may also be employed. Since carbon monoxide is given off as the product of this reaction, and an excess of carbon monoxide, pressure may inhibit further formation of the desired aromatic group VIB transition metal tricarbonyl compound, it is advantageous to vent excess carbon monoxide through a condenser when the process of this invention is conducted at elevated pressures.

A particularly preferred embodiment of this invention comprises reacting under reflux conditions at atmospheric pressure, a cycloheptatriene compound, as defined above, with group VIB transition metal carbonyl.

No solvent is required in conducting the process of this invention, the cycloheptatriene compound being employed in excess to serve as a carrier for the group VIB transition metal carbonyl. However, it is often convenient to employ an inert diluent having a boiling point above about 115° C. in the process. High-boiling saturated hydrocarbons are the preferred solvents. Other solvents which can be employed include higher boiling ethers, high-boiling aliphatic esters, silicone oils, aliphatic polyesters, and other liquids inert to the primary reactants. Examples of the compounds useable as solvents in the process of this invention include n-octane, n-nonane, n-decane and the various iso-decanes and other paraffinic hydrocarbons having up to about 20 carbon atoms, such as eicosane, octadecane, pentadecane and the like. Ether solvents which may be employed include ethyloctylether, amyl ethyl ether, ethyl heptylether, and ethyl hexylether, Ester solvents which may be employed include pentyl 2-methylpropanoate, pentyl butanoate, butyl butanoate, γ-methylbutyl butanoate, ethyl decanoate, methyl decanoate, pentyl hexanoate, ethyl hexanoate, and the like. Applicable silicone oils include copolymers and homopolymers of the various organosiloxanes and organosilanes having the appropriate boiling range. Examples of these are the dimethyl polysiloxanes, methylphenyl polysiloxanes, diphenyl polysiloxanes, di(chlorophenyl) polysiloxanes, hexaethyldisiloxane, hexapropyl disilane, diethyldipropyldiphenyldisilane and the like. The polyesters applicable as solvents in the process of this invention are completely esterified dicarboxylic acids. Esters may be employed derived from succinic, maleic, pyrotartaric, glutaric, adipic, pimelic, suberic, azelaic, sebacic and pinic acids, specific esters being di(1-methyl-4-ethyloctyl)glutarate, di(2 - ethylhexyl)adipate, di(3 - methylbutyl)axelate, di(2-ethylhexyl)azelate, di(2-ethylhexyl)sebacate, di(3,5,5 - trimethylhexyl)sebacate, di(2 - ethylhexyl)maleate, di(methylcyclohexyl)adipate, 2 - ethylhexyl-1-methylheptyl sebacate, and the like.

The cycloheptatriene group VIB transition metal carbonyl compounds prepared by the process of this invention can be recovered by evaporation of the excess cycloheptatriene reactant and solvent. The compounds may be purified by recrystallization from hydrocarbons or lower aliphatic ethers.

The following examples, in which all parts and percentages are by weight, are illustrative of the compounds of this invention and their preparation.

*Example I*

To a reaction vessel fitted with a reflux condenser, was charged 156 parts of molybdenum carbonyl and about 80 parts of cycloheptatriene. The mixture was heated at reflux temperature, about 116–118° C. for 7 hours. After the heating period, the excess unreacted cycloheptatriene was removed under vacuum. The resulting deep red solid was then extracted with several portions of low boiling petroleum ether (about 40–60° C.). The combined extracts were filtered and the resulting solution was cooled to −78° C. on an acetone Dry-Ice bath. The cooling caused precipitation of deep red crystals which were removed by filtration and recrystallized again from petroleum ether. The resulting cycloheptatriene molybdenum carbonyl was further purified by sublimation in a high vacuum at 75–85° C. on to an ice-cooled probe. The yield of pure cycloheptatriene molybdenum carbonyl, having a melting point of 99.6° C. was 69 parts.

*Example II*

The procedure of Example I was followed employing chromium hexacarbonyl instead of molybdenum hexacarbonyl. Cycloheptatriene chromium tricarbonyl was produced at approximately 40 percent yield. This compound has no definite melting point but decomposes above about 90° C.

*Example III*

Proceeding according to the method of outlined in Example I, molybdenum hexacarbonyl was heated at reflux with phenyl cycloheptatriene and an excess of petroleum ether (B.P. 120° C.). The reaction produced phenylcycloheptatriene molybdenum tricarbonyl.

*Example IV*

Cycloheptatrienyl cycloheptatriene and molybdenum carbonyl in an excess of petroleum ether (B.P. 120° C.) were heated together to the reflux temperature of the system to produce a good yield of cycloheptatrienyl cycloheptatriene molybdenum tricarbonyl.

*Example V*

A total of 100 parts of molybdenum hexacarbonyl and 200 parts of 1-methylcycloheptatriene are heated at the boiling point of the methylcycloheptatriene for 1 hour in 400 parts of a high boiling methylphenyl polysiloxane. Methylcycloheptatriene molybdenum tricarbonyl results from this reaction.

*Example VI*

A total of 60 parts of tungsten hexacarbonyl and 130 parts of bromocycloheptatriene in 200 parts of decane as a solvent, are heated at reflux for 2 hours. The reaction produces a good yield of 1-bromocycloheptatriene tungsten tricarbonyl.

*Example VII*

By heating 200 parts of 1, 3-di-ethoxycycloheptatriene and 40 parts of chromium carbonyl at reflux for 10 hours, di-ethoxycycloheptatriene chromium tricarbonyl is produced.

*Example VIII*

Following the procedure of Example I, molybdenum carbonyl and 1-methyl-4-phenylcycloheptatriene are reacted to produce methylphenylcycloheptatriene molybdenum tricarbonyl.

*Example IX*

The apparatus consists of a vessel equipped with heating means and a conduit for passing vapor into a thermal reactor tube which is also equipped with heating means so that a vaporized liquid may be passed over the solid reactant in the thermal reactor tube. Following the reactor tube is a cold trap for isolating reaction products. The vessel is charged with a quantity of cycloheptatriene and molybdenum hexacarbonyl is placed in the reactor tube. The system is then flushed with nitrogen and a continuous flow of nitrogen is maintained above the cycloheptatriene and passes with the cycloheptatriene vapor over the molybdenum carbonyl in the reactor tube. The reactor tube is heated and maintained at about 140° C. The cycloheptatriene is heated to the boiling point and the cycloheptatriene vapor is carried over the molybdenum carbonyl in the reactor tube. Cycloheptatriene molybdenum tricarbonyl is isolated in the cold trap.

*Example X*

Following the procedure of Example VI, the cycloheptatrieneone is reacted with molybdenum hexacarbonyl in ethyl hexyl ether as a solvent to yield cycloheptatrieneone molybdenum tricarbonyl.

*Example XI*

Following the procedure of Example I, 1-hydroxymethylcycloheptatriene is reacted with tungsten hexacarbonyl.

*Example XII*

In a pressure resistant vessel equipped with heating means, a temperature measuring device and means for charging and discharging gaseous, liquid and solid reactants, is placed 160 parts of molybdenum hexacarbonyl and 1000 parts of cycloheptatriene. The vessel is then sealed and the temperature raised to 225° C. This temperature is maintained for 6 hours with the charge over 100 p.s.i. of nitrogen pressure. The vessel is then cooled, vented and discharged and the reaction worked up as described in Example I. An excellent yield of cycloheptatriene molybdenum tricarbonyl results.

*Example XIII*

Following the procedure of Example XII, 100 parts of tungsten hexacarbonyl and 300 parts of phenylcycloheptatriene are reacted in 600 parts of di(1-methyl-4-ethyloctyl)glutarate at 300° for 1 hour. Phenylcycloheptatriene tungsten tricarbonyl results.

The compounds of the present invention vary insofar as their thermal stability is concerned, but all of them can be decomposed at a temperature above 400° C. The thermal decomposition of the compound results in the formation of metallic mirrors comprising a layer or coating of a particular group VIB transition metal. These metallic layers and coatings have useful and desirable properties of electrical conductance, furnish protection against corrosion when they are applied to base materials susceptible to corrosion and likewise have a decorative effect. The compounds of the present invention can also be deposited on glass, glass cloth, resins and other insulating supports, and the resultant metal-coated material can be used as conductors and insulating tapes for electrical applications. The metals can be deposited on the support in the desired proportions by thermal decomposition using classical processes in order to obtain the so-called "printed" electrical circuits. Similarly the metals can be applied to metallic supports to increase the corrosion resistance and on glass or asbestos cloth to obtain decorative metallic surfaces and designs. In order to effect the deposition of the metals by thermal decomposition of the compounds of the present invention, it is preferred to use inert gases, e.g., argon, as protecting or covering gas in order to reduce to a minimum oxidation by air or oxygen.

Deposition on glass cloth illustrates the applied processes. A glass cloth band weighing 1 gram is dried for one hour in an oven at 150° C. Then together with 0.5 gram of cycloheptatriene chromium tricarbonyl it is enclosed in a glass tube devoid of air and heated at 400° C. for one hour, after which time the tube is cooled and opened. The cloth has a uniform metallic gray appearance and exhibits a gain in weight of about 0.02 gram. The cloth has a greatly decreased resistivity. Each individual fibre proves to be a conductor. As would be expected, the application of a current to the cloth causes an increase in temperature. Thus, a conducting cloth has been prepared. This cloth can be used to reduce static electricity, for decoration, for thermal insulation by reflection, as protection and as a heating element.

The chemical entities of the present invention can be used to deposit the respective group VIB transition elements in the catalytic form on suitable supports. Thus, the compounds of the present invention can be thermally decomposed using elevated temperatures of 250–400° C. or above, preferably in an atmosphere of argon or other inert gas, e.g., krypton, in order to obtain supported group VIB transition elements in the catalytically active form. Other classical processes can be used to deposit the metallic catalysts, using the chemical entities according to the present invention. For example, a solution of methyl cycloheptatriene molybdenum tricarbonyl is mixed with infusorial earth, the compound being adsorbed on the infusorial earth. The adsorption product is separated by filtration and heated in air to decomposition temperature of the methyl cycloheptatriene tricarbonyl, yielding a catalytically active surface of molybdenum oxide. The catalyst is useful in the refining of petroleum fractions. The catalyst can also be deposited on alumina.

I claim:

1. A cycloheptatriene metal carbonyl coordination compound having the formula AM(CO)₃ where A is a cycloheptatriene organic compound consisting of atoms selected from the class consisting of carbon, hydrogen, oxygen, nitrogen and halide atoms and having from 7 to about 14 carbon atoms and M is a transition metal of group VIB of the periodic table.

2. The compound of claim 1 wherein M is molybdenum.

3. Cycloheptatriene molybdenum tricarbonyl.

4. Cycloheptatriene chromium tricarbonyl.

5. A cycloheptatriene metal carbonyl coordination compound having the formula:

AM(CO)₃ where A is an organic cycloheptatriene compound consisting of atoms selected from the class consisting of carbon, hydrogen, oxygen, nitrogen and halide atoms and containing from 7 to about 14 carbon atoms in which the cycloheptatriene ring is substituted only with radicals selected from the group consisting of hydrogen, alkyl, hydroxy, amino, alkoxy, halogen, aryl, carboxyalkyl, hydroxyalkyl and carboxy and M is a transition metal of group VIB of the periodic Table.

6. A process for preparing a cycloheptatriene group VIB transition metal carbonyl compound which comprises reacting a group VIB transition metal hexacarbonyl with an organic cycloheptatriene compound consisting of atoms selected from the class consisting of carbon, hydrogen, oxygen, nitrogen and halide atoms and containing from 7 to about 14 carbon atoms in which the cycloheptatriene molecule is substituted only with radicals selected from the group consisting of hydrogen, alkyl, hydroxy, amino, alkoxy, halogen, aryl, carboxyalkyl, hydroxyalkyl and carboxy.

7. Process of claim 6 where the group VIB transition metal carbonyl is molybdenum carbonyl.

8. The compounds of claim 1 wherein A is cycloheptatriene.

9. The compounds of claim 8 wherein M is molybdenum.

10. A process for preparing cycloheptatriene group VIB transition metal carbonyl compounds in which the cycloheptatriene group is a hydrocarbon group containing from 7 to about 14 carbon atoms, which method comprises reacting a group VIB transition metal hexacarbonyl compound with a cycloheptatriene hydrocarbon compound containing from 7 to about 14 carbon atoms.

11. The process of claim 10 wherein said group VIB transition metal hexacarbonyl is molybdenum hexacarbonyl.

12. Process of claim 11 wherein the reaction is conducted at the reflux temperature of the system.

13. The process of claim 7 wherein the reaction is conducted at the reflux temperature of the system.

References Cited in the file of this patent

UNITED STATES PATENTS 2,409,167     Veltman _____ Oct. 8, 1946

OTHER REFERENCES

Wilkinson: "J. Am. Chem. Soc.," vol. 76, No. 1, January 5, 1954, p. 209.

Piper et al.: "J. Inorg. Nuvl. Chem.," vol. 3, 1956, p. 104.

Abel et al.: Proceedings of the Chem. Soc., pp. 152–153 (May 1958).

Hallam et al.: Journal of the Chem. Soc. (London), pp. 642–645 (February 1958).